(12) United States Patent
Tokutomi et al.

(10) Patent No.: US 8,299,784 B2
(45) Date of Patent: Oct. 30, 2012

(54) DEVICE FOR TRANSPORTING MAGNETIC HEAD, DEVICE FOR INSPECTING MAGNETIC HEAD, AND METHOD FOR MANUFACTURING MAGNETIC HEAD

(75) Inventors: Teruaki Tokutomi, Saitama (JP); Akira Tobita, Saitama (JP); Tsuneo Nakagomi, Saitama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 271 days.

(21) Appl. No.: 12/819,422

(22) Filed: Jun. 21, 2010

(65) Prior Publication Data
US 2010/0327863 A1 Dec. 30, 2010

(30) Foreign Application Priority Data
Jun. 24, 2009 (JP) ................................ 2009-149402

(51) Int. Cl.
*G01R 33/02* (2006.01)
*G01R 33/12* (2006.01)

(52) U.S. Cl. ................ 324/210; 324/251; 324/252

(58) Field of Classification Search .......... 324/210, 324/251, 252
See application file for complete search history.

(56) References Cited

U.S. PATENT DOCUMENTS
2008/0137075 A1* 6/2008 Fujii et al. ............... 356/73

FOREIGN PATENT DOCUMENTS
JP 2003-248911 9/2003
JP 2009-230845 10/2009
* cited by examiner

*Primary Examiner* — Reena Aurora
(74) *Attorney, Agent, or Firm* — J.C. Patents

(57) ABSTRACT

A device for transporting a magnetic head, a device for inspecting a magnetic head, and a method for manufacturing a magnetic head are provided. The device for transporting a magnetic head is capable of freely changing a posture of a thin film magnetic head when transporting a row bar-shaped thin film magnetic head. The transporting device for transporting a slender rectangular plate-like, that is, row bar-shaped magnetic head, cut from a wafer is capable of performing vertical installation and horizontal installation. The transporting device for transporting a slender rectangular plate-like, i.e., row bar-shaped magnetic head, is capable of performing the vertical installation and horizontal installation, and changing the posture of the magnetic head from vertical installation into horizontal installation and from horizontal installation into vertical installation when transporting the magnetic head between processes. The transporting device is capable of performing a slantwise installation in a slantwise state between the vertical installation and the horizontal installation. Therefore, with respect to a vertically or horizontally installed tray when transporting the magnetic head between processes, the row bar-shaped thin film magnetic head can be transported easily.

8 Claims, 12 Drawing Sheets

DEVICE FOR TRANSPORTING MAGNETIC HEAD, DEVICE FOR INSPECTING MAGNETIC HEAD, AND METHOD FOR MANUFACTURING MAGNETIC HEAD

CROSS-REFERENCE TO RELATED APPLICATION

This application claims the priority benefit of Japan application Ser. No. 2009-149402, filed on Jun. 24, 2009. The entirety of the above-mentioned patent application is hereby incorporated by reference herein and made a part of specification.

BACKGROUND OF THE INVENTION

1. Field of the Invention

The present invention generally relates to a device for transporting a magnetic head for transporting a row bar-shaped thin film magnetic head cut from a wafer, and a device for inspecting a magnetic head as well as a method for manufacturing a magnetic head using the device for transporting a magnetic head, in particular, the present invention relates to a device for transporting a magnetic head, a device for inspecting a magnetic head, and a method for manufacturing a magnetic head, capable of transporting a row bar-shaped thin film magnetic head with respect to a carrying portion of an inspection device.

2. Description of Related Art

In recent years, with the rapid increase of surface recording density of a hard disk drive (HDD), the write track width of a thin film magnetic head becomes smaller, so the technology for accurately inspecting the write track width written onto a magnetic disk by a recording head (element) contained in the thin film magnetic head is more and more important.

In the prior art, the shape of the recording head (element) contained in the thin film magnetic head is detected by using an optical microscope. However, as the track width becomes smaller, the write track width reaches the resolution of the optical system or is even lower than the resolution of the optical system, so it is difficult to detect the shape of the recording head (element) by using an optical microscope. Therefore, a scanning electron microscope (SEM) is adopted to replace the optical microscope to detect the shape of the recording head (element) recently. However, the detection with SEM is a destructive inspection, and like the optical microscope, the SEM merely detects the physical shape of the recording head (element), and the following problem occurs, that is, it is difficult to determine the correlation of the effective track width (write track width) of the magnetism actually written onto the magnetic disk. Furthermore, even the technique of using an atomic force microscope (AFM) is adopted to detect the shape of the recording head (element), the same problem still occurs. Recently, in Japanese Patent Publication No. 2003-248911, a device for detecting a magnetic head is disclosed, in which the device for detecting a magnetic head has the following structure: a magnetic force microscope (MFM) is used to visually observe the magnetic field saturation phenomena as a magnetic field characteristic of the recording head.

When the SEM or AFM is used to detect the shape of the magnetic head (recording head), although the physical shape of the recording head (element) can be detected, the effective track width of the magnetism actually written onto the magnetic disk (write track width) cannot be determined. Therefore, in the prior art, in a state after the magnetic head and a suspension are integrated (head gimbal assembly (HGA) state) or a simulation HGA state, a special detecting device for head disk (referred to as a spin-stand) is used to inspect the write track width.

However, if the inspection using the spin-stand is not performed in a final process of magnetic head manufacturing, i.e., in the HGA state or the simulation HGA state, the inspection of the write track width cannot be performed. Therefore, the method is not very ideal in view of improving productivity or early feedback required during manufacturing.

Therefore, the applicant of the present invention proposed a method and a device for inspecting a magnetic head, which can perform the inspection of the write track width of a row bar-shaped magnetic head at a stage as early as possible during the manufacturing process (Japanese Patent Publication No. 2003-248911 and Japanese Patent Application No. 2008-263746). Moreover, in the application, a transporting mechanism for transporting a row bar-shaped thin film magnetic head to a staged portion of a carrying table of the inspecting device is also described. The transporting mechanism arranges and stores a plurality of row bar-shaped thin film magnetic heads on a tray at a tilt angle of 45 degrees, two ends of each row bar are hooked by hook parts of hook fingers and lifted up from the tray, and the thin film magnetic heads are moved and transported by a handling robot, and located on the staged portion of the carrying table. As all the row bar-shaped thin film magnetic heads stored on the tray are maintained at a tilt angle of 45 degrees, special hook fingers are required to suspend the row bar-shaped thin film magnetic heads in the tilt state.

In another aspect, when processing or inspecting the row bar-shaped thin film magnetic heads, various trays (storage cases) will be used when transporting the magnetic heads between processes, and the storage state or posture etc. (tilt angle) of the row bar-shaped thin film magnetic heads is different in different storage cases. Furthermore, an inspection device for inspection during the processes requires the row bar-shaped thin film magnetic heads to face a fixed direction for inspection. Therefore, when performing automatic inspection of the row bar-shaped thin film magnetic heads, a mechanism for rotating or aligning the row bar-shaped thin film magnetic heads before or after the inspection is required.

However, the row bar-shaped thin film magnetic head is a slender rectangular plate having a lateral width of about 1 mm, a height of about 0.2-0.3 mm, and a length of about 40-70 mm, and the slender rectangular plate has about 90 head sliders formed in the length direction, and thus the problem of difficulty in processing occurs because of the shape.

SUMMARY OF THE INVENTION

Accordingly, the present invention is directed to a device for transporting a magnetic head, a device for inspecting a magnetic head, and a method for manufacturing a magnetic head, capable of freely changing a posture of a row bar-shaped thin film magnetic head when transporting the thin film magnetic head.

A first characteristic of the device for transporting a magnetic head of the present invention is as follows. A slender rectangular plate-like magnetic head, that is, a row bar-shaped magnetic head, cut from a wafer is transported, and the device has such a structure that the magnetic head is capable of being randomly installed in a manner of vertical installation or horizontal installation. In the vertical installation, the magnetic head is installed in a manner that a long edge of a rectangle of a section, cut-out vertically to a length direction, of the row bar-shaped magnetic head is vertical to a horizontal line, that is, the long edge of the rectangle is vertical to the horizontal line, and in the horizontal installation the magnetic head is installed in a manner that the long edge is parallel to the horizontal line. The transporting device for transporting the slender rectangular plate-like magnetic head, that is, a row bar-shaped magnetic head, cut from a wafer is capable of performing the vertical installation and the horizontal installation. Thus, compared with the vertically or horizontally installed tray when transporting the magnetic head between processes, the row bar-shaped thin film magnetic head can be transported easily.

A second characteristic of the device for transporting a magnetic head of the present invention is as follows. A slender rectangular plate-like magnetic head, that is, a row bar-shaped magnetic head, cut from a wafer is transported, and the device has such a structure that a posture of the row bar-shaped magnetic head can be converted from a vertical installation state into a horizontal installation state, and the posture of the row bar-shaped magnetic head can be converted from the horizontal installation state into the vertical installation state. In the vertical installation, the magnetic head is installed in a manner that a long edge of a rectangle of a section, cut-out vertically to a length direction, of the row bar-shaped magnetic head is vertical to a horizontal line, that is, the long edge of the rectangle is vertical to the horizontal line, and in the horizontal installation the magnetic head is installed in a manner that the long edge is parallel to the horizontal line. The transporting device for transporting the slender rectangular plate-like magnetic head, that is, a row bar-shaped magnetic head, cut from a wafer is capable of performing the vertical installation and the horizontal installation, and the posture of the magnetic head can be converted from vertical installation into horizontal installation as well as from horizontal installation into vertical installation when the magnetic head is transported between processes.

According to the first or the second characteristic of the device for transporting a magnetic head, a third characteristic of the device for transporting a magnetic head of the present invention is as follows. The device has such a structure that the row bar-shaped magnetic head is capable of being slantwise installed in a posture that a long edge tilts to a specified angle with respect to a horizontal line. The transporting device is capable of performing slantwise installation in a slantwise state between the vertical installation and the horizontal installation.

A first characteristic of the device for inspecting a magnetic head of the present invention is as follows. Properties of a slender rectangular plate-like magnetic head, that is, a row bar-shaped magnetic head, cut from a wafer are inspected. The device further includes a magnetic head transporting mechanism; the mechanism receives the row bar-shaped magnetic head from a tray mechanism vertically installed in a manner that a long edge of a rectangle of a section, cut-out vertically to a length direction, of the row bar-shaped magnetic head is vertical to a horizontal line, converts a posture of the row bar-shaped magnetic head into a horizontal installation state installed in a manner that the long edge is parallel to the horizontal line, and transports the row bar-shaped magnetic head in the horizontal installation state to a carrying portion of an inspection stage in the horizontal installation state. The transporting device is used to receive the row bar-shaped magnetic head from the tray with the vertically installed row bar-shaped magnetic head, and horizontally installs the magnetic head on a carrying table on the inspection stage of the device for inspecting a magnetic head.

According to the first characteristic of the device for inspecting a magnetic head, a second characteristic of the device for inspecting a magnetic head of the present invention is as follows. The device includes: a cantilever mechanism, having a magnetic probe at a front end, and excited at a specified frequency; a probe mechanism, contacting a connecting terminal of a head slider of the row bar-shaped magnetic head horizontally installed on the carrying portion of the inspection stage, and supplying an excitation signal to a recording head of the magnetic head; a scanning mechanism, for scanning and moving along a surface of a recording portion of the magnetic head supplied with the excitation signal and horizontally installed on the carrying portion of the inspection stage in a state that the magnetic probe is maintained at a position whose distance, from the surface of the recording portion of the recording head, is equivalent to a suspension height of the magnetic head with respect to a magnetic disk; a detecting mechanism, for detecting an excitation state of the cantilever mechanism during a scanning process of the scanning mechanism; and a calculating mechanism, for calculating an effective track width of the magnetic head according to a signal representing the excitation state, of the cantilever mechanism, detected by the detecting mechanism. The transporting device is applied in the device for inspecting a magnetic head as follows. A record signal (excitation signal) is input to the row bar-shaped thin film magnetic head from a bonding pad, and a magnetic field generated by the recording head (element) contained by the thin film magnetic field is directly observed with an MFM by scanning and moving at a position at a distance equivalent to the suspension height of the magnetic head. Thus, a pattern of the generated magnetic field instead of the physical shape of the recording head (element) is detected, so as to achieve non-destructive inspection of the effective track width of the magnetic head.

According to the first characteristic of the device for inspecting a magnetic head, a third characteristic of the device for inspecting a magnetic head of the present invention is as follows. The device includes: a cantilever mechanism of an atomic force microscope (AFM), excited at a specified frequency; a magnetic field detecting mechanism, including a Hall component or a magneto resistance (MR) component disposed on the cantilever mechanism; a probe mechanism, contacting a connecting terminal of a head slider of the row bar-shaped magnetic head horizontally installed on the carrying portion of the inspection stage, and supplying an excitation signal to a recording head of the magnetic head; a scanning mechanism, for scanning and moving along a surface of the recording portion of the magnetic head supplied with the excitation signal and horizontally installed on the carrying portion of the inspection stage in a state that the magnetic field detecting mechanism is maintained at a position whose distance, from the surface of the recording portion of the recording head, is equivalent to a suspension height of the magnetic head with respect to a magnetic disk; a detecting mechanism, for detecting the signal output from the magnetic field detecting mechanism during a scanning process of the scanning mechanism; and a calculating mechanism, for calculating an effective track width of the magnetic head according to a signal detected by the detecting mechanism. The transporting device is applied in the device for inspecting a magnetic head as follows. A record signal (excitation signal) is input to the row bar-shaped thin film magnetic head from a bonding pad, and a magnetic field generated by the recording head (element) contained by the thin film magnetic field is directly observed with the Hall component or MR component disposed on the cantilever mechanism of an MFM by scanning and moving at a position at a distance equivalent to the suspension height of the magnetic head. Thus, the pattern of the generated magnetic field instead of the physical shape of the recording head (element) is detected, so as to achieve non-destructive inspection of the effective track width of the magnetic head.

A first characteristic of the method for manufacturing a magnetic head is as follows. The magnetic head is manufactured through the following processes: a wafer process, including film forming, milling, and washing; a row bar process, including cutting a strip-like row bar from a wafer after the wafer process, and performing processes of lapping, acrylonitrile-butadiene-styrene (ABS) surface processing, washing, and carbon protective film forming on the row bar; a recording head test process, including receiving the row bar from a tray mechanism vertically installed in a manner that a long edge of a section, that is, a rectangle, of the strip-like row bar vertical to a length direction is vertical to a horizontal line, converting a posture of the row bar into a horizontal installation state installed in a manner that the long edge is parallel to the horizontal line, transporting the row bar in the horizontal installation state to a carrying portion of an inspection stage in the horizontal installation state, and detecting an effective track width of the magnetic head in the strip-like row bar with a magnetic force microscope (MFM), a scanning Hall probe microscope (SHPM), or a scanning magneto-resistive microscope (SMRM); a read element test process, including detecting electromagnetic conversion characteristics of a read element of the strip-like row bar; a slider process, including cutting and processing the strip-like row bar into chip-like ones, and performing washing and inspection; and a head gimbal assembly process, including jointing the processed chip-like magnetic heads and a suspension, and performing washing and inspection. From the row bar process till the recording head test process, the row bar-shaped magnetic head is transported by using the transporting device.

According to the first characteristic of the method for manufacturing a magnetic head, a second characteristic of the method for manufacturing a magnetic head of the present invention is as follows. The recording head test process includes the following: in a state that the excitation signal is supplied to the recording head portion of the magnetic head in the strip-like row bar and the magnetic probe of the cantilever mechanism of the MFM is maintained at a distance, from the surface of the record portion of the magnetic head, equivalent to the suspension height of the magnetic head with respect to a magnetic disk, the magnetic probe scans and moves along a surface of the recording head portion of the magnetic head, to detect the signal representing the excitation state of the cantilever mechanism, and detect the effective track width of the magnetic head according to a detected signal. During the recording head test process, the device for inspecting a magnetic head having the second characteristic is used.

According to the first characteristic of the method for manufacturing magnetic head, a third characteristic of the method for manufacturing a magnetic head is as follows. The recording head test process includes in a state that the excitation signal is supplied to the recording head portion of the magnetic head in the strip-like row bar and a Hall component or an MR component disposed on the cantilever mechanism of the AFM is maintained at a position whose distance, from the surface of the record portion of the magnetic head, is equivalent to the suspension height of the magnetic head with respect to a magnetic disk, the Hall component or the MR component scans and moves along a surface of the recording head portion of the magnetic head, to detect the signal from the Hall component or the MR component, and to measure the effective track width of the magnetic head according to a detected signal. During the recording head test process, the device for inspecting a magnetic head having the third characteristic is used.

Effect of the Present Invention

The present invention has the effect of freely changing the posture of the thin film magnetic head when transporting the row bar-shaped thin film magnetic head.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 12 is a conceptual view of the amplified structure of the magnetic head portion.

DESCRIPTION OF THE EMBODIMENTS

Figure 1:
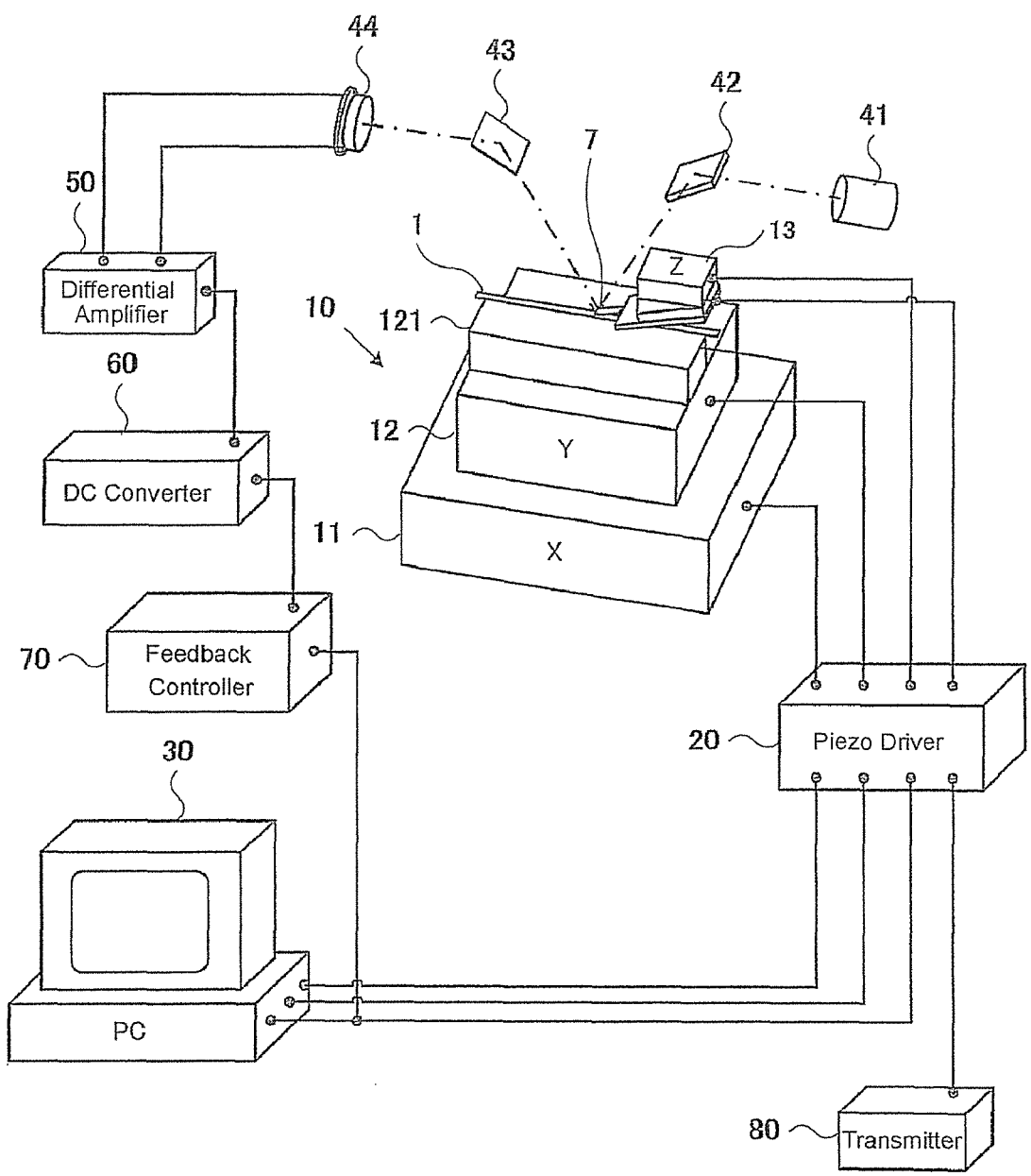
FIG. 1 is a schematic structural view of a device for inspecting a magnetic head according to an implementation aspect of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
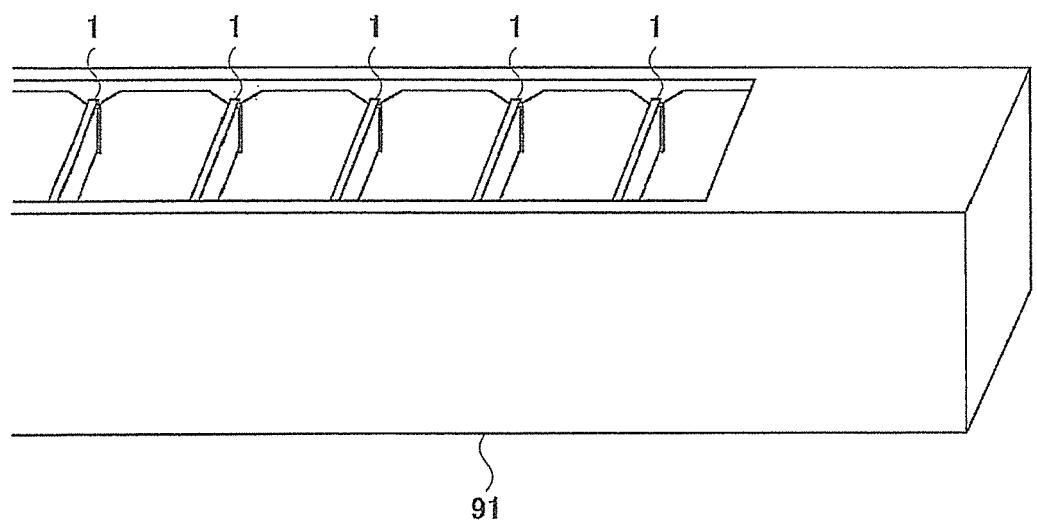
FIG. 2 shows a tray for accommodating a row bar.

FIG. 1 is a schematic structural view of a device for inspecting a magnetic head according to an implementation aspect of the present invention. FIG. 2 shows a tray for accommodating a row bar. In the device for inspecting a magnetic head in FIG. 1, the effective track width of an MR magnetic head, a giant magneto resistive (GMR) magnetic head, and a tunnelling magneto resistive (TMR) magnetic head can be detected at a row bar (a block formed by head sliders) state in a process before cutting a slider single body (chip).

Generally, a row bar is a slender block having a size of 4 cm~7 cm cut from a wafer. A row bar includes about 60~90 head sliders. The device for inspecting a magnetic head of the implementation aspect has such a structure that specific inspection is carried out on a row bar 1 as a work piece. As shown in FIG. 2, 20~30 row bars 1 are arranged in the minor axis direction (left-right direction of FIG. 2) at a specified interval, and are accommodated in a tray 91. In FIG. 1, the row bar 1 is vertically installed on the tray 91. The vertical installation is to install the row bar in a manner that a length direction of a rectangle in a section vertical to the length direction of a major axis of the row bar is in a direction vertical to a horizontal line (direction of gravity). The horizontal installation is to install the row bar in a manner that the length direction of the rectangle in the section vertical to the major axis of the row bar is in a direction parallel to the horizontal line. A handling robot (not shown) takes the row bars 1 out from the tray 91 one by one, and transports the row bar onto an inspection stage 10. The row bar 1 that has been transported to and disposed on the inspection stage 10 is inspected as follows.

Figure 3:
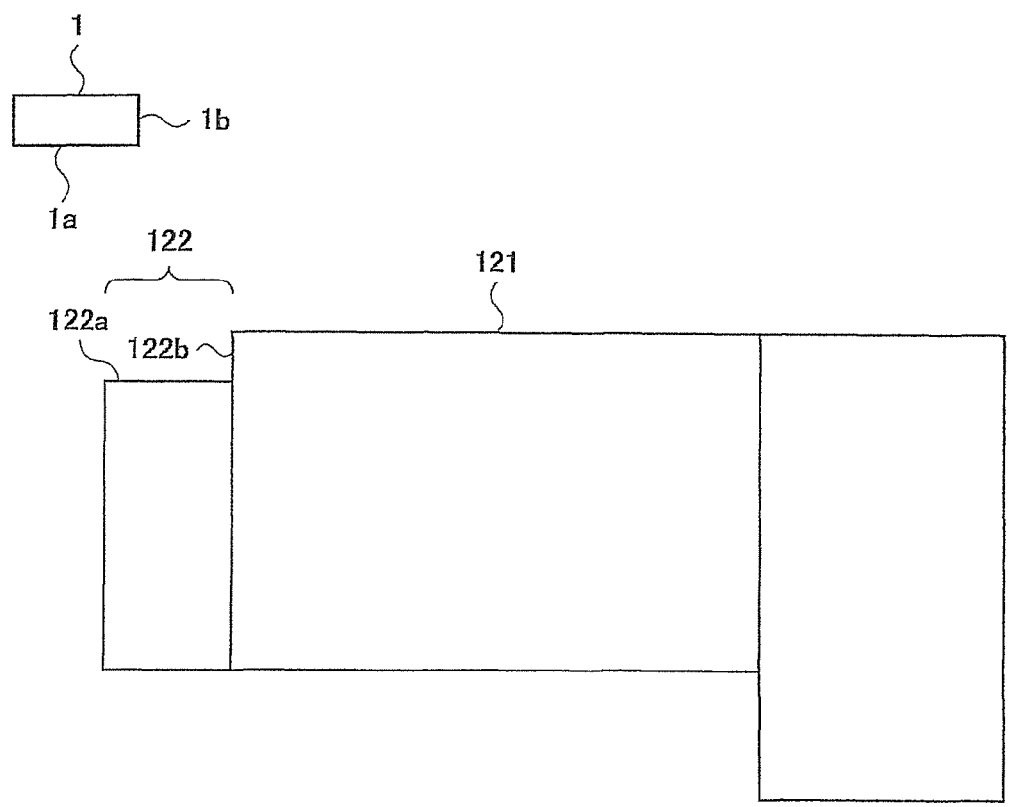
FIG. 3 is a detailed structural view of a carrying portion of an inspection stage of FIG. 1.
Figure 3:
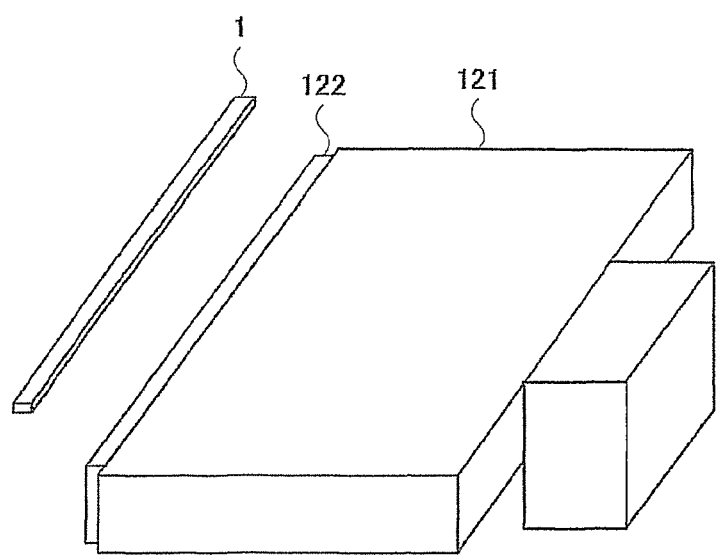

FIG. 3 is a detailed structural view of a carrying portion of the inspection stage of FIG. 1. The inspection stage 10 includes an X stage 11 and a Y stage 12 for the row bar 1 to moving in an X and a Y direction. A single side in the major axis of the row bar 1 contacts a base surface of a carrying portion 121 on the Y stage 12 for once, so as to locate the row bar 1. That is, the Y stage 12 has the carrying portion 121 for locating the row bar 1 disposed thereon. A staged portion 122 substantially matching the shape of the row bar 1 is disposed on a side of an upper surface of the carrying portion 121.

Through the fact that the row bar 1 is engaged respectively on a bottom 122*a* and a side 122*b* of the staged portion 122, the row bar 1 will be carried on a specified position in horizontal installation. A bottom 1*a* of the row bar 1 engages the bottom 122*a* of the staged portion 122, and a back side 1*b* of the row bar 1 (a surface opposite to a surface having connecting terminals of the magnetic head) engages a back surface 122*b* of the staged portion 122. Each of the engaged surfaces 122*a* and 122*b* has a base surface. The base surfaces are at positions parallel and orthogonal with a moving direction (X axis) of the X stage 11 and a moving direction (Z axis) of the Z stage 13 respectively. Therefore, the row bar 1 can be located in the X direction and the Z direction by engaging the bottom 122*a* and back surface 122*b* of the staged portion 122 of the Y stage 12. A camera (not shown) for determining the position shift is disposed above the Y stage 12.

Figure 4:
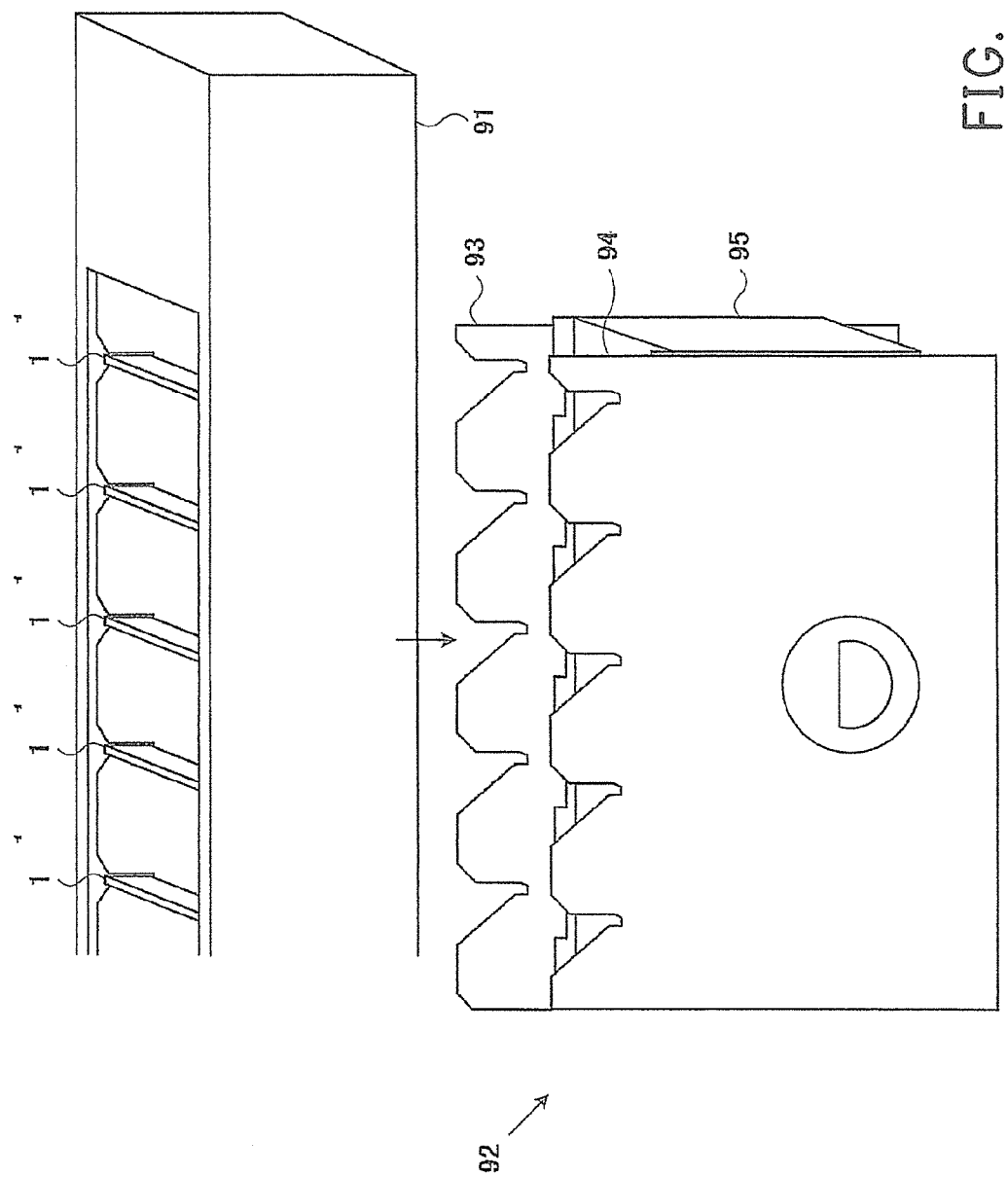
FIG. 4 shows an action of a device for transporting a magnetic head according to an embodiment of the present invention.

FIG. 4 shows an action of a device for transporting a magnetic head according to an embodiment of the present invention. As shown in FIG. 2, the row bar 1 is vertically installed in the tray 91, but the row bar 1 must be horizontally installed in the carrying portion 121 of the inspection stage 10. Therefore, a mechanism for converting the row bar 1 from the vertical installation into the horizontal installation is required. The device for transporting a magnetic head of the present invention has the function of converting the row bar 1 vertically installed on the tray 91 into the horizontal installation. The tray 91 is formed as a hollow box without a bottom plate, and two inner sides of the tray 91 have concave parts for maintaining two ends of the row bar 1 in the vertical direction. The row bar 1 is vertically installed by inserting the row bar 1 into the concave parts through the weight itself.

Figure 5:
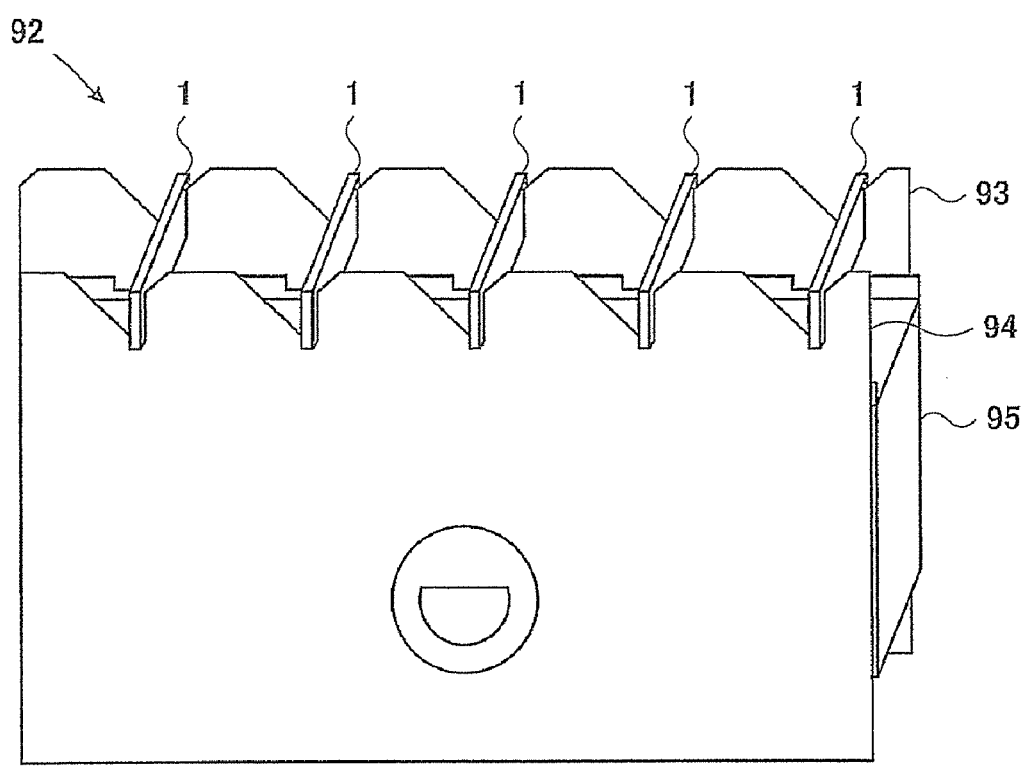
FIG. 5 shows a state of vertically installing a row bar on a tray shown in FIG. 4 onto a row bar supplier by moving the tray downwards in a manner of covering the row bar supplier.

As shown in FIG. 4, the tray 91 with the row bar 1 vertically installed is installed onto a row bar supplier 92 disposed close to the inspection stage 10 in FIG. 1. That is, as shown in FIG. 4, as the tray 91 does not have a bottom plate, the tray is moved downwards in a manner that the bottom covers the row bar supplier 92 to be installed. FIG. 5 shows a state that the row bar 1 on the tray 91 is vertically installed on the row bar supplier 92 by moving the tray 91 downwards in a manner of covering the row bar supplier 92. The row bar supplier 92 includes row bar supporters 93, 94, and a row bar fixing base portion 95.

Figure 6:
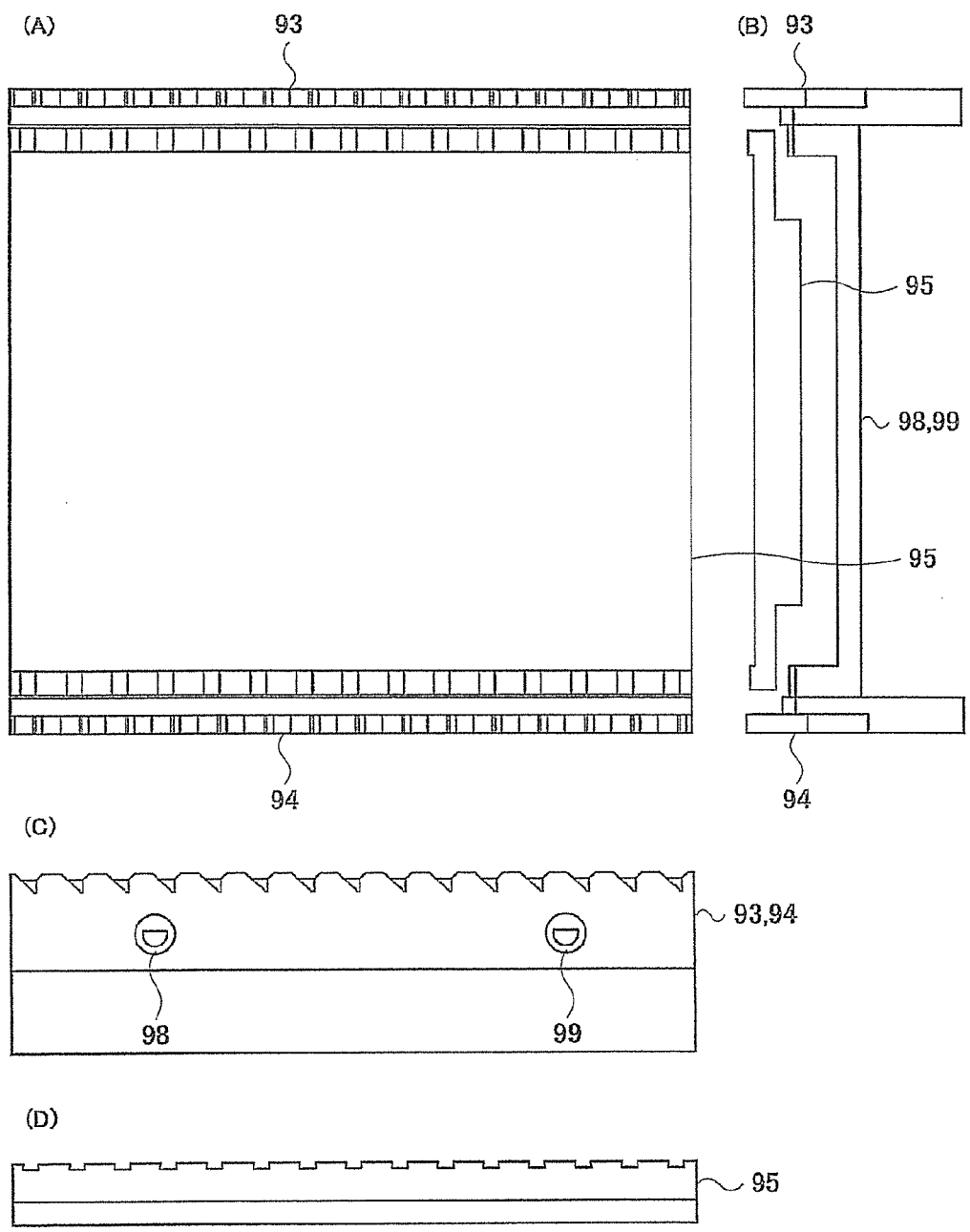
FIGS. 6 (A), (B), (C), and (D) show a structure of the row bar supplier.

FIGS. 6(A), (B), (C), and (D) show a structure of a row bar supplier, in which FIG. 6(A) is a top view of the row bar supplier from top to down, FIG. 6(B) is a side view of the row bar supplier of FIG. 6(A) from the right side, FIG. 6(C) is a side view of the row bar supplier of FIG. 6(A) from the bottom side, and FIG. 6(D) is a side view of a row bar fixing base portion of the row bar supplier of FIG. 6(A) from the bottom side. As shown in FIG. 5 and FIGS. 6(A), (B), (C), and (D), the row bar supplier 92 includes a row bar fixing base portion 95, for horizontally installing a plurality of row bars 1 at a specified interval; and row bar supporters 93, 94, disposed at the right and left sides of the row bar fixing base portion 95 (the upper and lower sides in FIGS. 6(A), (B), (C), and (D)), and for converting the row bars 1 from vertical installation into horizontal installation through slantwise installation of 45 degrees.

The row bar supporters 93, 94 are formed as a sawtooth shape by combining tilt lines of 45 degrees and vertical lines, and the front end of the sawtooth shape is cut off in the horizontal direction. The concaved part of the sawtooth shape has a horizontal part having the same length as that of the row bar 1 in the minor axis at the bottom thereof. By carrying the minor axis of the row bar 1 (back side 1*b* of the row bar 1 in FIG. 3) on the horizontal part, the row bar 1 is vertically installed on the row bar supporters 93, 94. The row bar supporters 93, 94 are combined through connecting components 98, 99. The row bar fixing base portion 95 is located in a space formed by the row bar supporters 93, 94 and the connecting components 98, 99, and is arranged to be freely moved in the up and down direction (the left and right direction in FIG. 6) in the space. The moving mechanism of the row bar fixing base portion 95 is not shown in the figures. Furthermore, the row bar supporters 93, 94 have a plurality of concave parts for horizontally installing the row bars 1 along the length direction (the left and right direction in FIGS. 6(A) and (D)) of the left and right ends (the up and down direction in FIGS. 6(A), (B), (C), and (D)). The shape of the concave parts is formed to have a length that can carry the major axis surface (the bottom 1*a* of the row bar 1 in FIG. 3) of the row bar 1.

Figure 7:
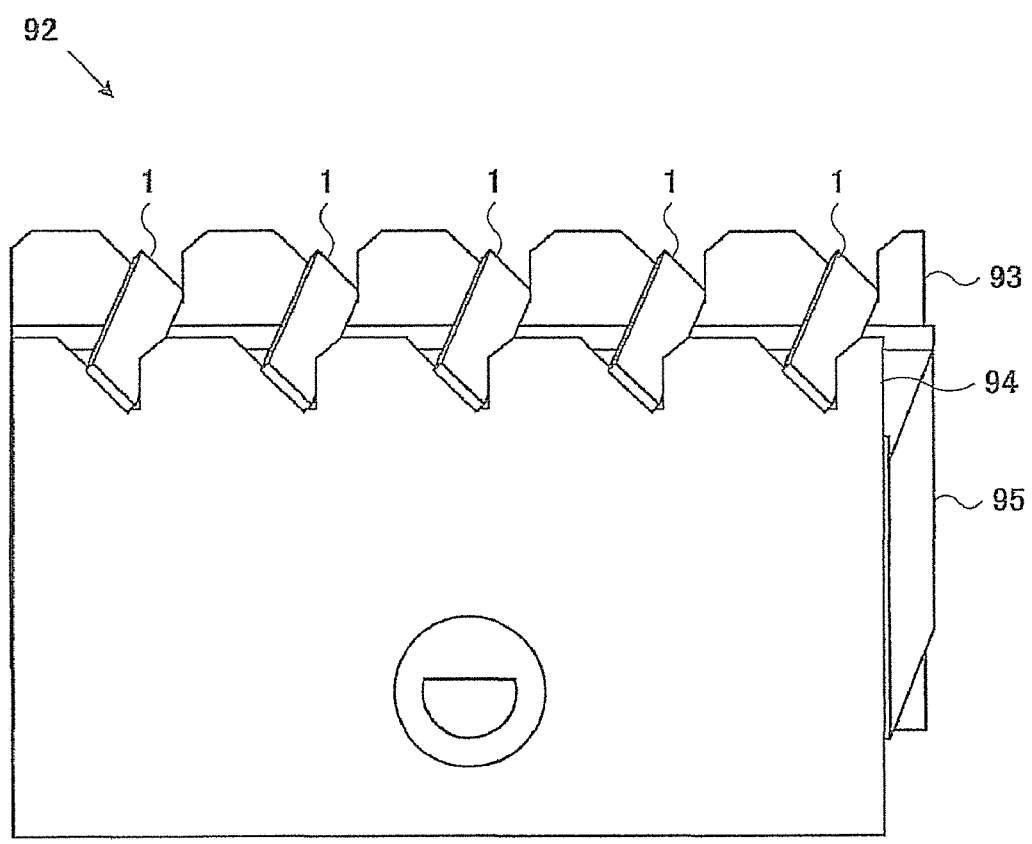
FIG. 7 is a diagram showing changing a posture of the row bar vertically installed on the row bar supplier into a state at a tilt angle of 45 degrees.

FIG. 7 is a diagram showing changing a posture of the row bar 1 vertically installed on the row bar supplier 92 to a state at a tilt angle of 45 degrees. That is, as shown in FIGS. 6(A), (B), (C), and (D), the row bar 1 vertically installed on the row bar supplier 92 is lowered downwards through the row bar supporters 93, 94 (the row bar fixing base portion 95 rises relatively), to relieve the limit in the vertical direction, such that the row bar 1 tilts along the sawtooth-shaped tilt line of 45 degrees of the row bar supporters 93, 94 due to the weight itself, thereby the posture is changed from the vertical installation into slantwise installation of 45 degrees. When the row bar 1 is tilted by 45 degrees and is installed on the carrying portion 121 of the inspection stage 10, the row bar 1 is installed in the state of FIG. 7 by the row bar supplier 92.

Figure 8:
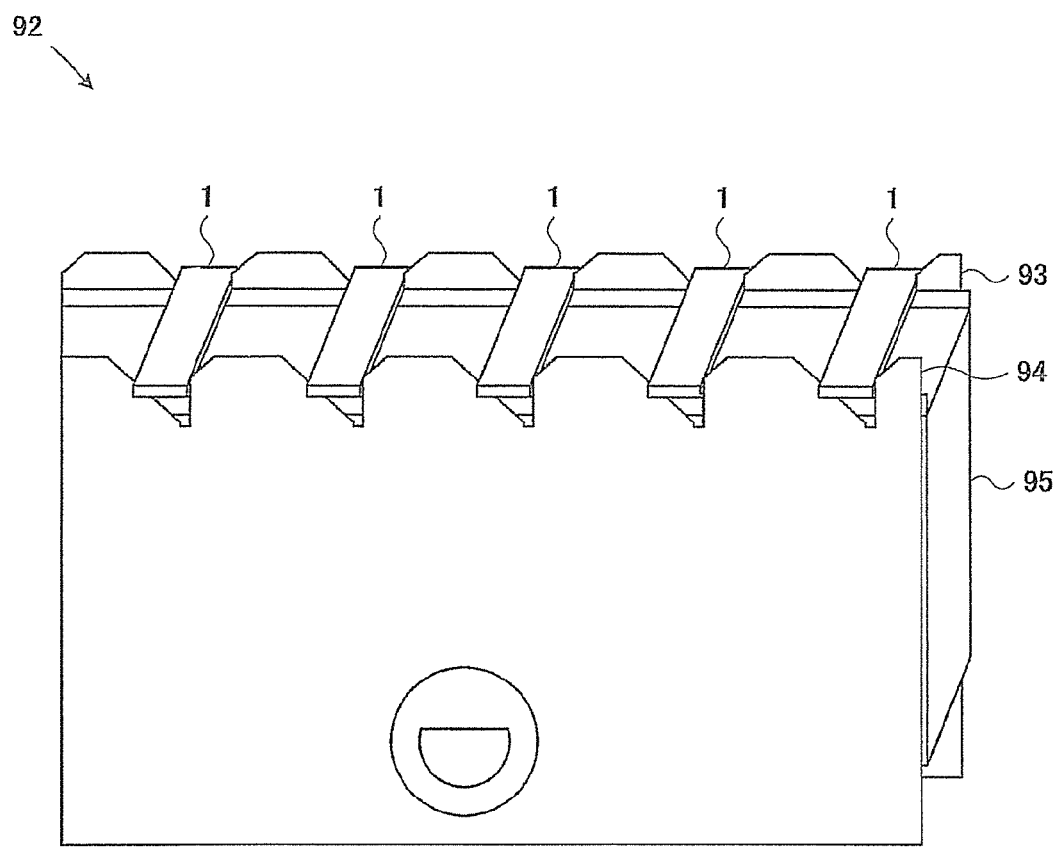
FIG. 8 is a diagram showing changing a posture of the row bar in the row bar supplier that has been changed into a state at a tilt angle of 45 degrees into a state of horizontal installation.

FIG. 8 is a diagram showing changing a posture of the row bar 1 in the row bar supplier 92 that has been changed into a state at a tilt angle of 45 degrees into a state of horizontal installation. In the implementation aspect, as the row bar 1 must be horizontally installed on the carrying portion 121 of the inspection stage 10, the row bar supporters 93, 94 are further lowered downwards from the state in FIG. 7 (the row bar fixing base portion 95 rises relatively), so as to horizontally install the row bar 1 on a fixing surface as a transporting base (the plane of the row bar fixing base portion 95). Furthermore, the movement of the row bar 1 in the horizontal direction is limited by the tilt plane and the vertical plane of the sawtooth-shaped tilt line of 45 degrees of the row bar supporters 93, 94, so as to fully ensure the accuracy of the position of the row bar 1 in the transporting portion. The upper surface of the row bar 1 horizontally installed as shown in FIG. 8 is sucked by a handling robot and maintained, and then in such a posture the row bar 1 is directly horizontally installed on the carrying portion 121 of the inspection stage 10.

Furthermore, in the implementation aspect, the row bar 1 is maintained along the sawtooth-shaped tilt line of 45 degrees of the row bar supporter 93, 94 in a slantwise state. However, the row bar 1 may be maintained at any tilt angle by adding a mechanism capable of randomly changing the angle of the tilt line of the row bar supporters 93, 94. For example, a mechanism capable of freely changing the tilt angle with a link mechanism is installed at the tilt line part of the row bar supporters 93, 94, such that the tilt angle can be freely changed. Furthermore, in the implementation aspect, the row bar is directly vertically installed on the row bar supporters 93, 94 from the vertically installed tray 91; when the tray is slantwise installed, the row bar supporters can be set to a slantwise installation state in advance, and then the row bar is conveyed from the tray.

When the row bar 1 engages the bottom 122*a* and the back surface 122*b* of the staged portion 122 of the Y stage 12 to be located as specified, the row bar 1 is sucked and maintained on the carrying portion 121, and the front of a probe of a probe card (not shown) contacts the terminal on the front side of the row bar 1. Thus, a coil for the recording head of the magnetic head of the row bar 1 is in an excitable state.

In FIG. 1, the Z stage 13 makes a cantilever part 7 of the MFM to move along the Z direction. The X stage 11, the Y stage 12, and the Z stage 13 of the inspection stage 10 include a piezo-stage respectively. A piezo driver 20 drives and controls the X stage 11, the Y stage 12, and the Z stage 13 (piezo-stages) of the inspection stage 10. A control part 30 includes a control computer, which uses a personal computer (PC) including a monitor as a basic component. As shown in FIG. 1, the cantilever part 7 with a magnetic probe having a sharp front end as the free end is disposed in an opposite direction at a position above the row bar 1 carried on the carrying portion 121 of the Y stage 12 of the inspection stage 10. The cantilever part 7 is installed on an exciting component disposed below the Z stage 13. The exciting component includes a piezo component, and applies an alternating voltage at a frequency near the mechanical resonance frequency according to the exciting voltage from the piezo driver 20, so as to make the magnetic probe to vibrate in the up and down direction.

A displacement detecting part includes a semiconductor laser component 41, reflecting mirrors 42, 43, and a displacement sensor 44. The displacement sensor 44 includes a dual-beam photo detector component. The light emitted from the semiconductor laser component 41 is reflected by the reflecting mirror 42, and then is irradiated onto the cantilever part 7, so the reflected light is reflected towards the reflecting mirror 43. The reflected light reflected by the cantilever part 7 is further reflected by the reflecting mirror 43, and then is guided into the displacement sensor 44. A differential amplifier 50 performs a specified calculation and processing on a differential signal of two signals output by the displacement sensor 44, and outputs a signal after the specified calculation and processing to a direct current (DC) converter 60. That is, the differential amplifier 50 outputs a displacement signal corresponding to the difference of two signals output by the displacement sensor 44 to the DC converter 60. The DC converter 60 includes a root mean squared value to direct current (RMS-DC) converter, and the RMS-DC converter converts the displacement signal output by the differential amplifier 50 into a DC signal of an effective value.

The displacement signal output by the differential amplifier 50 is a signal corresponding to the displacement of the cantilever part 7. Because the cantilever part 7 vibrates, the displacement signal is an AC signal. The signal output by the DC converter 60 is output to a feedback controller 70. The feedback controller 70 uses the signal output by the DC converter 60 as a signal for monitoring the current vibration of the cantilever part 7, and outputs the signal to the control part 30. The feedback controller 70 also uses the signal output by the DC converter 60 as a control signal of the Z stage 13 for adjusting the excitation of the cantilever part 7 and outputs the signal to a piezo driver 20. The control part 30 monitors the signal, and controls the Z stage 13 of the piezo driver 20 according to the value of the signal, so as to adjust the initial position of the cantilever part 7 before the detection starts. In the implementation aspect, the suspension height of the magnetic head of the HDD is set to the initial position of the cantilever part 7. A transmitter 80 supplies an oscillation signal for exciting the cantilever part 7 to the piezo driver 20. The piezo driver 20 drives the cantilever part 7 to vibrate at a specified frequency according to the oscillation signal from the transmitter 80.

Figure 9:
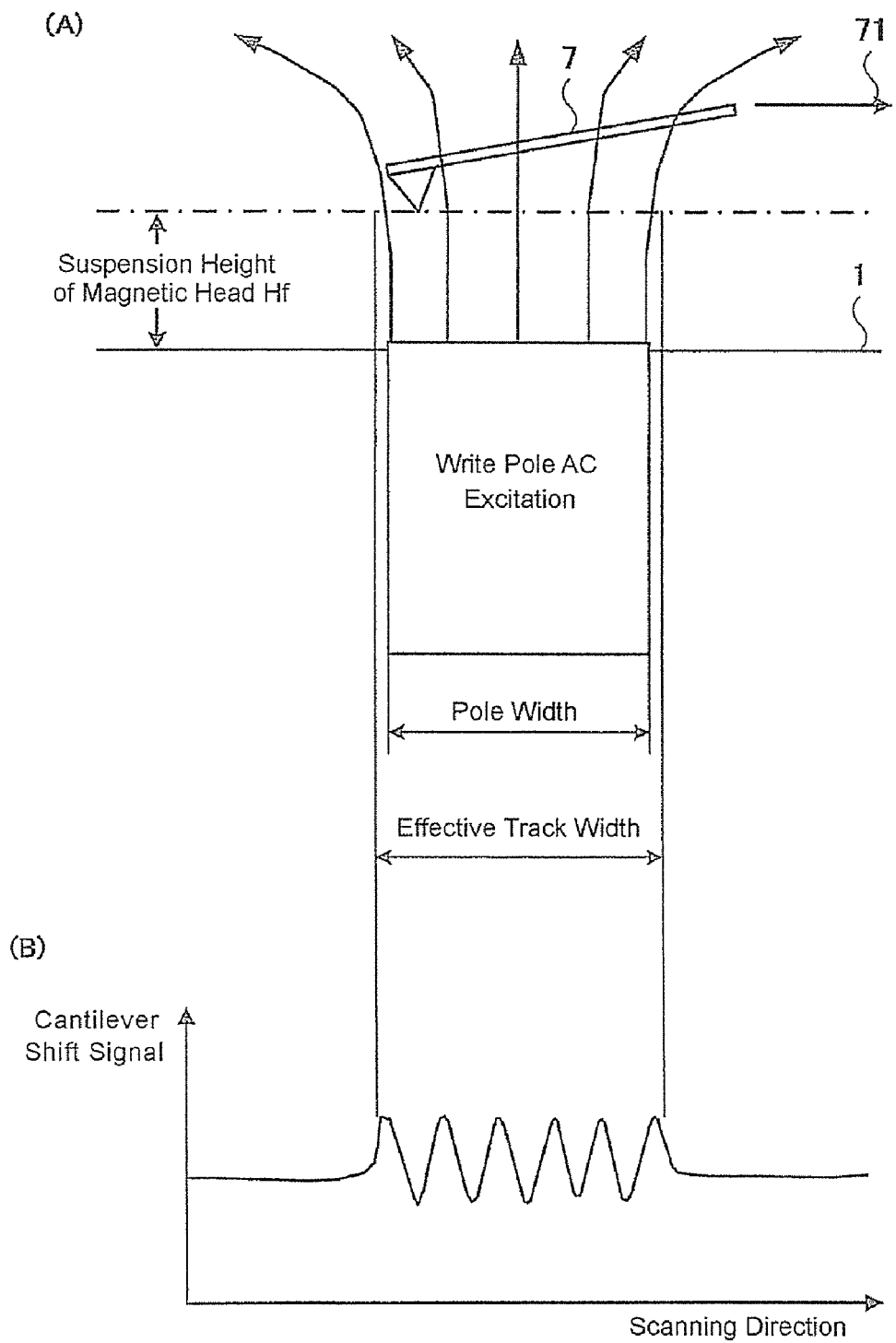
FIGS. 9 (A) and (B) are schematic views of an inspection method of the device for inspecting a magnetic head in FIG. 1, and FIGS. 9(A) and (B) are conceptual views of the amplified structure of the magnetic head portion.

FIGS. 9(A), (B) are schematic views of the inspection method of the device for inspecting a magnetic head in FIG. 1, in FIG. 9(A) shows an amplified structure of the magnetic head part, and FIG. 9(B) shows an example of the displacement signal of the cantilever part. As shown in FIGS. 1 and 9(A), the cantilever part 7 is located by the Z stage 13, such that the front end part of the magnetic probe of the cantilever part 7 is located at a height, from the surface of the magnetic head formed on the row bar 1, equivalent to the suspension height Hf of the magnetic head. The cantilever part 7 scans along a scanning direction 71 with respect to the row bar 1 (magnetic head). In the implementation aspect, the X stage 11 and the Y stage 12 enable the row bar 1 to move.

At this time, the recording head of the magnetic head is subject to AC excitation, so the cantilever part 7 is displaced synchronously with the AC excitation. The displacement state of the cantilever part 7 is like the displacement signal shown in FIG. 9(B), so by detecting the displacement signal, the effective track width of the magnetic head can be detected. Moreover, the recording head may also not be AC excited, but is inspected as a common MFM, so as to actually determine a pole width of the magnetic head.

As such, for the conventional MFM, although the actual pole width of the magnetic head is detected, as shown in the implementation aspect, the recording head of the magnetic head is AC excited, and at the same time, the cantilever part 7 scans and moves at the suspension height of the magnetic head, so as to inspect the effective track width of the recording head of the magnetic head, thereby achieving the effect of performing the inspection of the write track width of the magnetic head as early as possible during the manufacturing process.

Figure 10:
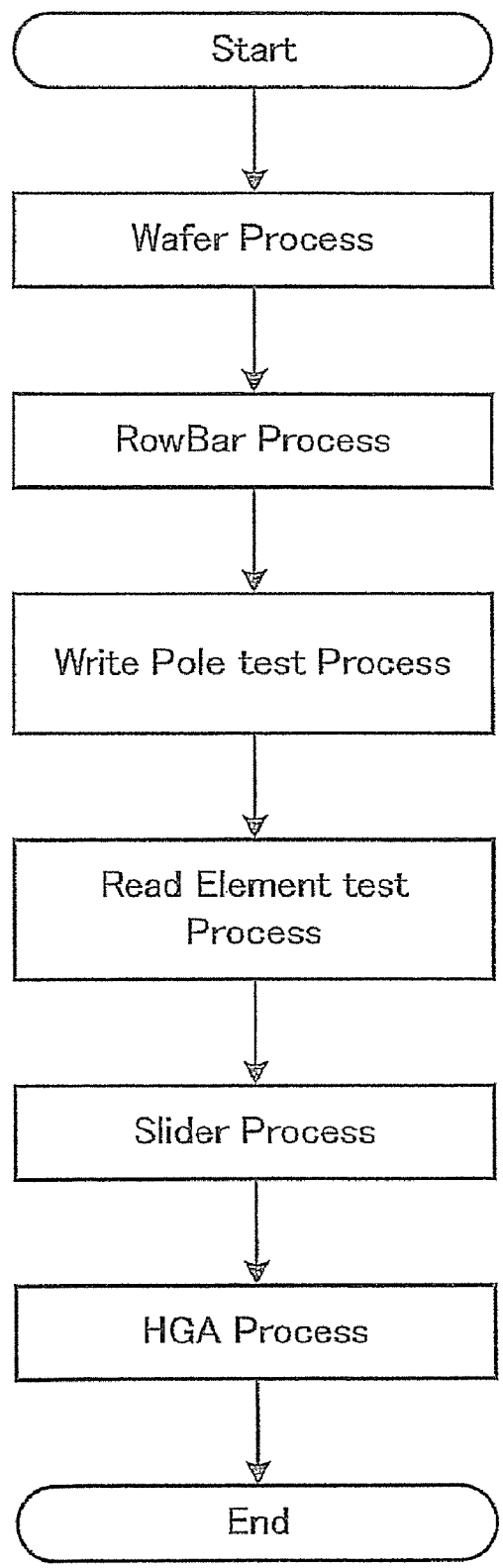
FIG. 10 is a diagram of a process for manufacturing a magnetic head including a recording head inspection process by using an MFM according to an embodiment of the present invention.

FIG. 10 is a diagram of a process for manufacturing a magnetic head including a recording head inspection process by using an MFM according to an embodiment of the present invention. As shown in FIG. 10, a wafer process includes the processes of film forming, milling, and washing. A row bar process includes cutting a strip-like row bar from a wafer, and performing lapping, ABS surface processing, washing, carbon protective film forming on the row bar. A recording head test process (write pole test process) includes horizontally installing the strip-like row bar cutting from the wafer on the carrying portion 121 of the inspection stage 10 by using the device for transporting a magnetic head, and determining the effective track width of the recording head of the horizontally installed row bar by using the MFM in FIG. 1. A read element test process includes detecting the electromagnetic conversion characteristics of the read element of the strip-like row bar. A slider process includes cutting the row bar into chip-like magnetic heads, and performing washing and inspection. A head gimbal assembly process (HGA process) includes jointing the processed chip-like magnetic heads and a suspension, and performing washing and inspection. Thereafter, an HDD process (not shown, including a head stack assembly (HAS) process and a head disk assembly (HDA) process) is performed. According to the implementation aspect, a defect judgement is performed on the effective track width of the recording head in the row bar state, so as to improve the productivity, and realize early feedback of previous processes.

Figure 11:
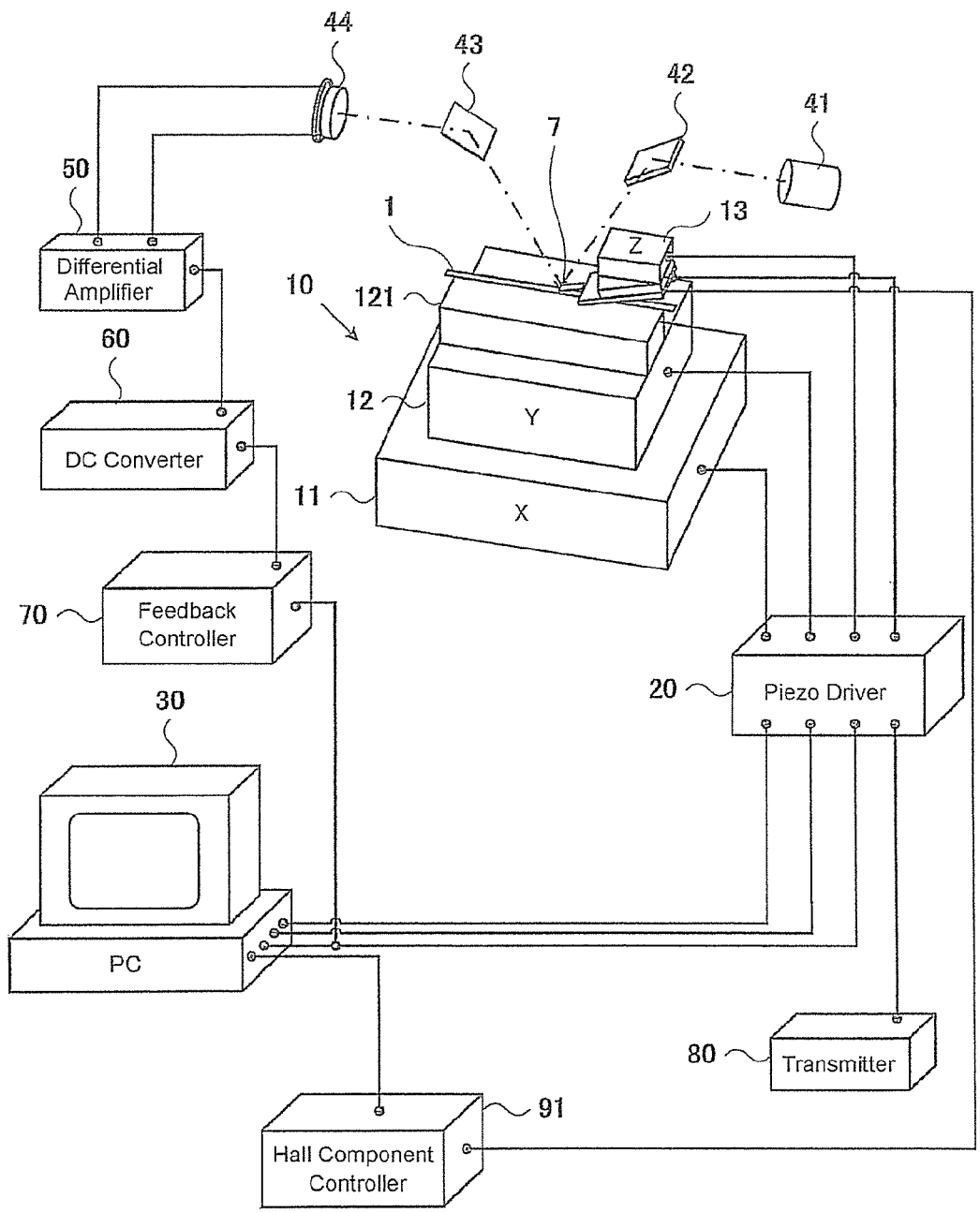
FIG. 11 is a schematic structural view of other embodiments of a device for inspecting a magnetic head according to an implementation aspect of the present invention.
Figure 12:
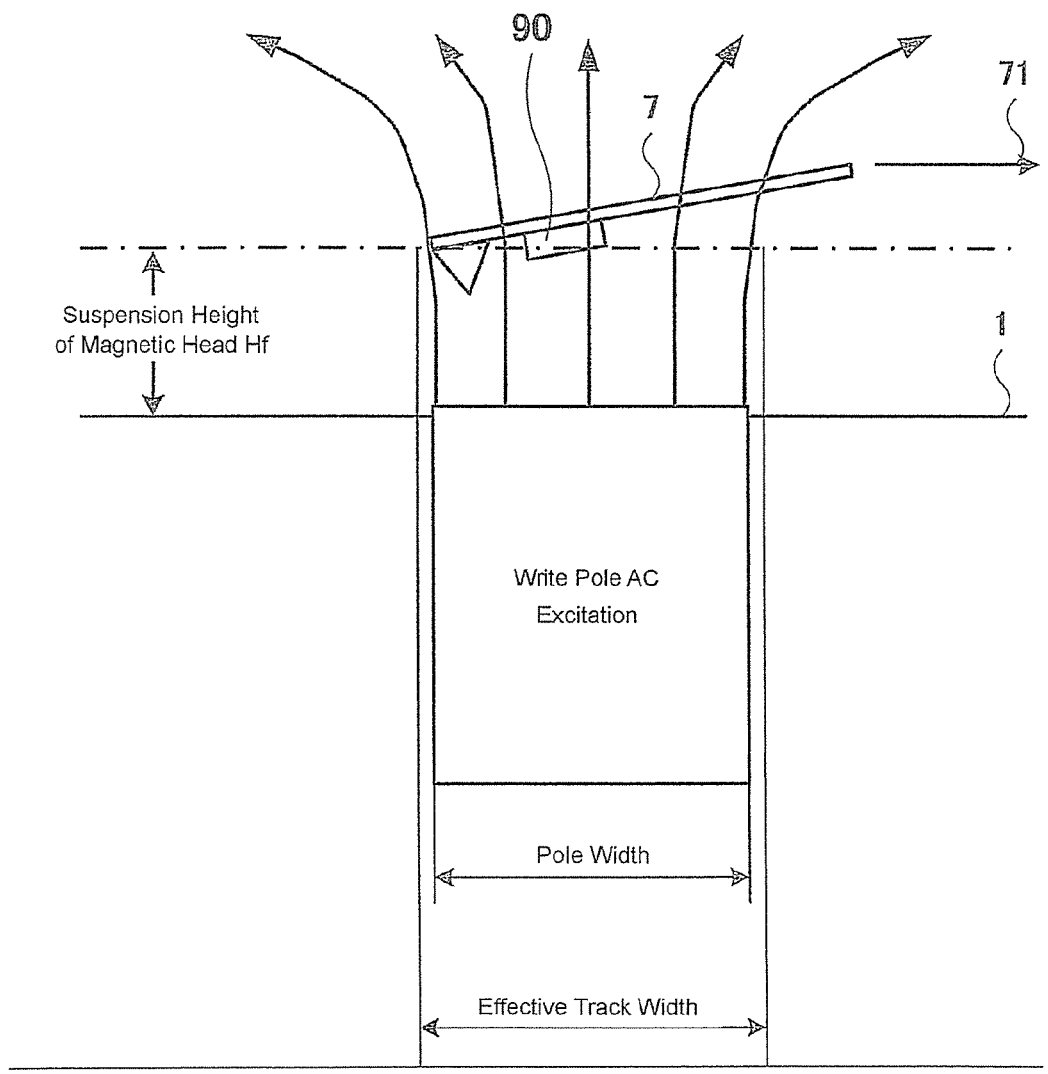
FIG. 12 is a schematic view of an inspection method of the device for inspecting a magnetic head in FIG. 11.

FIG. 11 is a schematic structural view of other embodiments of a device for inspecting a magnetic head according to an implementation aspect of the present invention. In FIG. 11, the same reference numbers are used to indicate the same parts in FIG. 1, and will not be described again. FIG. 12 is a schematic view of an inspection method of the device for inspecting a magnetic head in FIG. 11, and FIG. 12 is a conceptual view of the amplified structure of the magnetic head portion. The difference between the device for inspecting a magnetic head in FIGS. 11 and 12 and the device for inspecting a magnetic head in FIGS. 1 and 9 lies in that, the cantilever part 7 has a Hall component 90 disposed thereon for directly determining the shape (absolute values) of the magnetic field generated by the magnetic head, so as to detect the effective track width of the magnetism. That is, the device for inspecting a magnetic head in FIG. 11 is characterized in that, a scanning Hall probe microscope (SHPM) that makes the Hall component 90 infinitely close to the magnetic material to be observed to detect the magnetic field and to make the magnetic field visualized is used. The Hall component 90 is obtained by forming a pattern on a GaAs/AlGaAs epitaxial wafer through photolithography. A Hall component controller 91 supplies a current between terminals of the Hall component 90. The Hall component controller 91 uses a measuring meter such as a nano-bottle meter or the like to measure the Hall voltage generated between other terminals of the Hall component 90 at this time, and outputs the measured Hall voltage to the control part 30. The PC of the control part 30 produces a two-dimensional distribution of a spontaneous surface magnetic field according to the Hall voltage, and measures the effective track width of the magnetic head according to the two-dimensional distribution.

Alternatively, by forming a magneto-resistive (MR) sensor component on the front end of the cantilever part 7, a scanning magneto-resistive microscope (SMRM) may be used in the magnetism determination to replace the Hall component 90 installed on the cantilever part 7 of the device for inspecting a magnetic head in FIGS. 11 and 12. At this time, an MR sensor controller is disposed to replace the Hall component controller accordingly. Thus, the SHPM or the SMRM is to install a Hall component or an MR component on the cantilever part 7 of an MFM, so the shape detection and magnetism detection (detection of the effective track width) can be performed simultaneously.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device for transporting a magnetic head, for transporting a slender rectangular plate-like magnetic head, that is, a row bar-shaped magnetic head, cut from a wafer, wherein
the device has such a structure that a posture of the row bar-shaped magnetic head is convertible from a vertical installation state into a horizontal installation state, and from the horizontal installation state into the vertical installation state, in the vertical installation state the magnetic head is installed in a manner that a long edge of a rectangle of a section, cut-out vertically to a length direction, of the row bar-shaped magnetic head is vertical to a horizontal line, that is, the long edge of the rectangle is vertical to the horizontal line, and in the horizontal installation state the magnetic head is installed in a manner that the long edge is parallel to the horizontal line.

2. The device for transporting a magnetic head according to claim 1, wherein
the device has such a structure that the row bar-shaped magnetic head is capable of being slantwise installed in a posture that the long edge tilts to a specified angle with respect to the horizontal line.

3. A device for inspecting a magnetic head, for inspecting properties of a slender rectangular plate-like magnetic head, that is, a row bar-shaped magnetic head, cut from a wafer, comprising:
a magnetic head transporting mechanism, for receiving the row bar-shaped magnetic head from a tray mechanism vertically installed in a manner that a long edge of a rectangle of a section, cut-out vertically to a length direction, of the row bar-shaped magnetic head is vertical to a horizontal line, converting a posture of the row bar-shaped magnetic head into a horizontal installation state installed in a manner that the long edge is parallel to the horizontal line, and transporting, to be in a horizontal installation state, the row bar-shaped magnetic head in the horizontal installation state to a carrying portion of an inspection stage.

4. The device for inspecting a magnetic head according to claim 3, comprising:
a cantilever mechanism, having a magnetic probe at a front end, and excited at a specified frequency;
a probe mechanism, contacting a connecting terminal of a head slider of the row bar-shaped magnetic head horizontally installed on the carrying portion of the inspection stage, and supplying an excitation signal to a recording head of the magnetic head;
a scanning mechanism, for scanning and moving along a surface of a recording portion of the magnetic head supplied with the excitation signal and horizontally installed on the carrying portion of the inspection stage in a state that the magnetic probe is maintained at a position whose distance, from the surface of the recording portion of the recording head, is equivalent to a suspension height of the magnetic head with respect to a magnetic disk;

a detecting mechanism, for detecting an excitation state of the cantilever mechanism during a scanning process of the scanning mechanism; and a calculating mechanism, for calculating an effective track width of the magnetic head according to a signal representing the excitation state of the cantilever mechanism detected by the detecting mechanism.

5. The device for inspecting a magnetic head according to claim 3, comprising:

a cantilever mechanism of an atomic force microscope (AFM), excited at a specified frequency;

a magnetic field detecting mechanism, comprising a Hall component or a magneto resistance (MR) component disposed on the cantilever mechanism;

a probe mechanism, contacting a connecting terminal of a head slider of the row bar-shaped magnetic head horizontally installed on the carrying portion of the inspection stage, and supplying an excitation signal to a recording head of the magnetic head;

a scanning mechanism, for scanning and moving along a surface of the recording portion of the magnetic head supplied with the excitation signal and horizontally installed on the carrying portion of the inspection stage in a state that the magnetic field detecting mechanism is maintained at a position whose distance, from the surface of the recording portion of the recording head, is equivalent to a suspension height of the magnetic head with respect to a magnetic disk;

a detecting mechanism, for detecting a signal output from the magnetic field detecting mechanism during a scanning process of the scanning mechanism; and a calculating mechanism, for calculating an effective track width of the magnetic head according to a signal detected by the detecting mechanism.

6. A method for manufacturing a magnetic head, comprising:

a wafer process, comprising processes of film forming, milling, and washing;

a row bar process, comprising cutting a strip-like row bar from a wafer after the wafer process, and performing processes of lapping, acrylonitrile-butadiene-styrene (ABS) surface processing, washing, and carbon protective film forming on the row bar;

a recording head test process, comprising receiving the row bar from a tray mechanism vertically installed in a manner that a long edge of a section, that is, a rectangle, of the strip-like row bar vertical to a length direction is vertical to a horizontal line, converting a posture of the row bar into a horizontal installation state installed in a manner that the long edge is parallel to the horizontal line, transporting, to be in a horizontal installation state, the row bar in the horizontal installation state to a carrying portion of an inspection stage, and detecting an effective track width of the magnetic head in the strip-like row bar using a magnetic force microscope (MFM), a scanning Hall probe microscope (SHPM), or a scanning magneto-resistive microscope (SMRM);

a read element test process, comprising detecting electromagnetic conversion characteristics of a read element with respect to the strip-like row bar;

a slider process, comprising cutting and processing the strip-like row bar into chip-like ones, and performing washing and inspection; and a head gimbal assembly process, comprising jointing the processed chip-like magnetic heads and a suspension, and performing washing and inspection.

7. The method for manufacturing a magnetic head according to claim 6, wherein the recording head test process comprises in a state that an excitation signal is supplied to the recording head portion of the magnetic head in the strip-like row bar and in a state a magnetic probe of a cantilever mechanism of the MFM is maintained at a position whose distance, from a surface of a record portion of the magnetic head, is equivalent to a suspension height of the magnetic head with respect to a magnetic disk, the magnetic probe scanning and moving along a surface of the recording head portion of the magnetic head to detect a signal representing an excitation state of the cantilever mechanism, and to measure the effective track width of the magnetic head according to the detected signal.

8. The method for manufacturing a magnetic head according to claim 6, wherein the recording head test process comprises in a state that an excitation signal is supplied to the recording head portion of the magnetic head in the strip-like row bar and in a state a Hall component or a magneto resistance (MR) component disposed on of a cantilever mechanism of the MFM is maintained at a position whose distance, from a surface of a record portion of the magnetic head, is equivalent to a suspension height of the magnetic head with respect to a magnetic disk, the Hall component or the MR component scanning and moving along a surface of the recording head portion of the magnetic head to detect a signal from the Hall component or the MR component, and to measure the effective track width of the magnetic head according to the detected signal.

* * * * *